(12) United States Patent
Shen et al.

(10) Patent No.: US 12,283,105 B2
(45) Date of Patent: Apr. 22, 2025

(54) RAIL AREA EXTRACTION METHOD BASED ON LASER POINT CLOUD DATA

(71) Applicant: Suzhou TongRuiXing Technology Co., LTD, Taicang (CN)

(72) Inventors: Tuo Shen, Shanghai (CN); Lanxin Xie, Shanghai (CN); Tenghui Xue, Taicang (CN)

(73) Assignee: Suzhou TongRuiXing Technology Co., LTD, Taicang (CN)

(*) Notice: Subject to any disclaimer, the term of this patent is extended or adjusted under 35 U.S.C. 154(b) by 0 days.

(21) Appl. No.: 18/788,052

(22) Filed: Jul. 29, 2024

(65) Prior Publication Data

US 2025/0061718 A1    Feb. 20, 2025

(30) Foreign Application Priority Data

Aug. 14, 2023  (CN) .......................... 202311014777.9

(51) Int. Cl.
| | | |
|---|---|---|
| *G06V 10/00* | (2022.01) | |
| *G06V 10/26* | (2022.01) | |
| *G06V 10/44* | (2022.01) | |
| *G06V 10/762* | (2022.01) | |
| *G06V 20/50* | (2022.01) | |

(52) U.S. Cl.
CPC ............ *G06V 20/50* (2022.01); *G06V 10/273* (2022.01); *G06V 10/44* (2022.01); *G06V 10/762* (2022.01)

(58) Field of Classification Search
CPC ...... G06V 10/82; G06V 10/25; G06V 10/762; G06V 10/44; G06V 10/273; G06V 20/50; G06V 20/58; G06N 3/08; G06N 3/126; B61L 23/041
See application file for complete search history.

(56) References Cited

U.S. PATENT DOCUMENTS

| | | | | |
|---|---|---|---|---|
| 9,221,396 | B1* | 12/2015 | Zhu ........................ | G08G 1/163 |
| 10,081,376 | B2* | 9/2018 | Singh .................... | B61L 23/048 |
| 10,430,659 | B2* | 10/2019 | Jiang .................... | G06V 10/757 |
| 10,518,791 | B2* | 12/2019 | Singh .................... | G06F 18/251 |
| 10,776,661 | B2* | 9/2020 | Gu ............................ | G06T 7/77 |
| 11,004,202 | B2* | 5/2021 | Tchapmi ................ | G06N 3/045 |
| 11,443,523 | B2* | 9/2022 | Li ........................ | G05D 1/0246 |
| 11,698,262 | B2* | 7/2023 | Zhang .................. | G01C 21/343 |
| | | | | 701/450 |
| 11,893,785 | B2* | 2/2024 | Zeng ...................... | G06V 20/70 |

(Continued)

*Primary Examiner* — Amir Alavi (57) ABSTRACT

A rail area extraction method based on laser point cloud data is provided, including: preprocessing collected laser point cloud data; screening and clustering the laser point cloud data based on a fixed distance segmentation method, and representing laser point cloud data of reference objects by a main laser point cloud data cluster; projecting laser point cloud data of reference objects to a horizontal plane, fitting reference curves based on an improved differential evolution algorithm with a train left side reference curve as an upper boundary and a train right side reference curve as a lower boundary; selecting a target boundary line from upper and lower boundaries based on a laser point cloud data amount-density two-step decision method; calculating a rail area center line based on the target boundary line; and selecting a rail area boundary line extension method or rail area center line extension method to calculate the rail area.

2 Claims, 5 Drawing Sheets

(56) References Cited

U.S. PATENT DOCUMENTS

| | | | |
|---|---|---|---|
| 12,202,473 B2* | 1/2025 | Xia | B60W 30/0956 |
| 2023/0267615 A1* | 8/2023 | Agia | G01S 17/42 |
| | | | 345/419 |
| 2025/0061718 A1* | 2/2025 | Shen | G06V 20/50 |

* cited by examiner

RAIL AREA EXTRACTION METHOD BASED ON LASER POINT CLOUD DATA

CROSS-REFERENCE TO RELATED APPLICATION

This application claims priority to Chinese Patent Application No. 202311014777.9, filed on Aug. 14, 2023, which is herein incorporated by reference in its entirety.

TECHNICAL FIELD

The disclosure relates to the technical field of rail transit, and more particularly to a rail area extraction method based on laser point cloud data.

BACKGROUND

A train autonomous obstacle detection technology is of great significance for ensuring safety of train operations. A rail area (also referred to as track area) is a sensitive area for obstacle detection, therefore, extracting the rail area is a prerequisite for the obstacle detection.

Currently, a mainstream method for extracting the rail area is to use a camera and a light detection and ranging (LiDAR) to directly detect a rail to determine the rail area. However, the camera is greatly affected by lighting and weather conditions, and thus its anti-interference ability is poor. Using the LiDAR to directly detect the rail requires high density of laser point cloud data, and under the current performance limitations of the LiDAR, a detection distance achievable by this method is relatively short.

SUMMARY

A purpose of the disclosure is to overcome defeats in the related art, and provide a rail area extraction method based on laser point cloud data. The method uses side walls on both sides of the rail area parallel to rail as reference objects, and detects the reference objects to indirectly extract the rail area, thereby improving a detection distance of the rail area.

The disclosure is achieved through the following technical solutions.

A rail area extraction method based on laser point cloud data is provided, including:

S1, collecting laser point cloud data in front of a train, and filtering out incomplete laser point cloud data caused by limitation of a field of view of a LiDAR and laser point cloud data beyond a limited maximum detection distance from the laser point cloud data in front of the train, to thereby obtain remaining laser point cloud data;

S2, screening out, based on a fixed distance segmentation method, target laser point cloud data from the remaining laser point cloud data, clustering the target laser point cloud data to obtain laser point cloud data clusters, and taking a main cluster of the laser point cloud data clusters to represent laser point cloud data of reference objects;

S3, projecting the laser point cloud data of the reference objects to a horizontal plane, fitting, based on an improved differential evolution algorithm, reference curves of the reference objects, and taking a reference curve of reference objects on a left side of the train of the reference curves of the reference objects as an upper boundary, and a reference curve of reference objects on a right side of the train of the reference curves of the reference objects as a lower boundary;

S4, selecting, based on a laser point cloud data amount-density two-step decision method, a target boundary line from the upper boundary and the lower boundary;

S5, calculating, based on the target boundary line, a center line of a rail area; and S6, setting a threshold L, and based on a height difference between the upper boundary and the lower boundary, the threshold L, the target boundary line, and the center line of the rail area, selecting one of a rail area boundary line extension method and a rail area center line extension method segment by segment to thereby calculate the rail area.

In an exemplary embodiment, the rail area extraction method based on laser point cloud data further includes: detecting (for example, by the LiDAR) whether an obstacle exists in the rail area; in response to the obstacle exists in the rail area, sending a warning signal and a stopping instruction to a controller of the train to control the train to stop by the controller of the train to prevent the train from colliding with obstacle, to thereby ensure safe operation of the train. Specifically, the obstacle is an object that hinders the train from moving forward, and a size of the obstacle is not specifically defined herein and may be set by the skilled in the art.

In an embodiment, in the step S2, the screening out, based on a fixed distance segmentation method, target laser point cloud data from the remaining laser point cloud data, specifically includes:

S21, dividing, by using an interval with a length a, the remaining laser point cloud data to obtain laser point cloud data respectively corresponding to multiple intervals, and determining k highest points of the laser point cloud data corresponding to each of the multiple intervals and calculating an average value of the k highest points as an average height corresponding to each of the multiple intervals of the upper boundary; and determining k lowest points of the laser point cloud data corresponding to each of the multiple intervals and calculating an average value of the k lowest points as an average height corresponding to each of the multiple intervals of the lower boundary;

S22, extending, by using the average height corresponding to each of the multiple intervals of the upper boundary as a basis, a distance of length b downwards to form an upper selection area corresponding to each of the multiple intervals, and extending, by using the average height corresponding to each of the multiple intervals of the lower boundary as a basis, the distance of length b upwards, to form a lower selection area corresponding to each of the multiple intervals;

S23, selecting all laser point cloud data in the upper selection area corresponding to each of the multiple intervals and all laser point cloud data in the lower selection area corresponding to each of the multiple intervals; and S24, joining all laser point cloud data in the upper selection area corresponding to the multiple intervals to form a target upper selection area corresponding to the multiple intervals with an average width of b, and joining all laser point cloud data in the lower selection area corresponding to the multiple intervals to form a target lower selection area corresponding to the multiple intervals with the average width of b to thereby obtain the target laser point cloud data.

In an embodiment, in step S3, the fitting, based on an improved differential evolution algorithm, reference curves of the reference objects, specifically includes:

S31, generating an initial population randomly based on the laser point cloud data of the reference objects projected to the horizontal plane, where the initial population includes: m randomly generated individuals I, and elements in each of the individuals I are all term coefficients of a curve polynomial;

S32, performing a mutation operation on an $i^{th}$ individual $G_i$ in a current population to obtain a mutated individual $G_i'$; where the current population of a first iteration is the initial population, and a formula of the mutation operation is expressed as follows:

$$G_i' = I_a + k_{mutate} \times (I_b - I_c);$$

where $k_{mutate}$ represents a mutation probability, $I_a$, $I_b$ and $I_c$ represent three randomly generated individuals of the current population.

S33, performing a cross-selection operation on the $i^{th}$ individual $G_i$ and the mutated individual $G_i'$ to obtain a cross-selection individual $G''_i$; where a cross-selection operation of a $j^{th}$ element in the mutated individual $G_i'$ is expressed as follows:

$$G''_{ij} = \begin{cases} G'_{ij}, & G'_{ij} \leq k_{crossover} \\ G_{ij}, & G'_{ij} > k_{crossover} \end{cases};$$

where $k_{crossover}$ represents a cross-selection probability, $G_{ij}'$ represents a value of the $j^{th}$ element in the mutated individual $G_i'$, and $G_{ij}$ represents a value of a $j^{th}$ element in the $i^{th}$ individual $G_i$;

S34, calculating a root mean square error of the cross-selection individual $G''_i$, and updating a target solution (i.e., the reference curves of the reference objects) when the root mean square error is smaller than a root mean square error corresponding to an individual prior to the $i^{th}$ individual $G_i$ in the current population;

S35, performing the steps S32-S34 until all individuals in the current population are traversed; and S36, performing the steps S32-S35 until a maximum iteration number n is reached to thereby obtain the reference curves of the reference objects.

In an embodiment, in the step S4, the selecting, based on a laser point cloud data amount-density two-step decision method, a target boundary line from the upper boundary and the lower boundary, specifically includes:

calculating a number difference between the laser point cloud data of the upper boundary and the laser point cloud data of the lower boundary, determining whether the number difference exceeds a set threshold; in response to the number difference exceeding the set threshold, selecting a boundary with a larger number of laser point cloud data of the upper and lower boundaries as the target boundary line; or, in response to the number difference not exceeding the set threshold, calculating root mean square errors of the upper boundary and the lower boundary respectively, and selecting a boundary with a smaller root mean square error of the upper and lower boundaries as the target boundary line; where a formula for selecting the target boundary line is expressed as follows:

$$target = \begin{cases} A, & (n_A > n_B > \times \beta) \text{ or } (n_A \leq n_B \times \mu \text{ and } RMSE(A) \leq RMSE(B)) \\ B, & (n_A > n_B > \times \beta \text{ or } (n_B \leq n_A \times \mu \text{ and } RMSE(A) > RMSE(B)) \end{cases};$$

where A represents the upper boundary, B represents the lower boundary, target represents the target boundary line, $n_A$ represents a number of the laser point cloud data of the upper boundary, $n_B$ represents a number of the laser point cloud data of the lower boundary, μ represents a threshold coefficient, RMSE(A) represents a root mean square error of the upper boundary, and RMSE(B) represents a root mean square error of the lower boundary.

In an embodiment, in the step S6, the based on a height difference between the upper boundary and the lower boundary, the threshold L, the target boundary line, and the center line of the rail area, selecting one of a rail area boundary line extension method and a rail area center line extension method segment by segment to thereby calculate the rail area, specifically includes:

S61, selecting highest points and lowest points of the upper boundary and the lower boundary segment by segment, and calculating an average height $h_{up}$ of the highest points corresponding to each interval of the upper boundary and an average height $h_{down}$ of the lowest points corresponding to each interval of the lower boundary;

S62, customizing the threshold L, using the rail area center line extension method to calculate the rail area when a difference between the average height $h_{up}$ of the highest points and the average height $h_{down}$ of the lowest points is smaller than or equal to the threshold L; or using the rail area boundary line extension method to calculate the rail area when the difference between the average height $h_{up}$ of the highest points and the average height $h_{down}$ of the lowest points is greater than the threshold L; and where the using the rail area boundary line extension method to calculate the rail area when a difference between the average height $h_{up}$ of the highest points and the average height $h_{down}$ of the lowest points is smaller than or equal to the threshold L includes: extending a distance of $h_{extend}$ downwards from the upper boundary to form the rail area when the target boundary line is the upper boundary, or extending the distance of $h_{extend}$ upwards from the lower boundary to form the rail area when the target boundary line is the lower boundary; and the using the rail area center line extension method to calculate the rail area when the difference between the average height $h_{up}$ of the highest points and the average height $h_{down}$ of the lowest points is greater than the threshold L includes: extending a distance of $$\frac{1}{2}h_{extend}$$

upwards and downwards from the center line of the rail area respectively to form the rail area, where the rail area is expressed by the following formula:

$$h = \begin{cases} \left[\dfrac{|h_{up} - h_{down}|}{2} - \dfrac{1}{2}h_{extend}, \dfrac{|h_{up} - h_{down}|}{2} + \dfrac{1}{2}h_{extend}\right], & |h_{up} - h_{down}| \le L \\ [h_{down}, h_{down} + h_{extend}] \text{ or } [h_{up} - h_{extend}, h_{up}], & |h_{up} - h_{down}| \ge L \end{cases}.$$

Compared to the related art, the disclosure has the following advantages.

The disclosure does not extract the rail area by directly detecting the rail, but uses the side walls of the rail area parallel to the rail as the reference objects, and detects the reference objects with larger volume and the ability to obtain more point cloud data to indirectly extract the rail and determine the rail area, thereby increasing the detection distance of the rail area under the performance limitation of LiDAR, which helps to improve the obstacle detection distance and accuracy.

DETAILED DESCRIPTION OF EMBODIMENTS

The disclosure is described in detail in conjunction with drawings and embodiments below.

Figure 1:
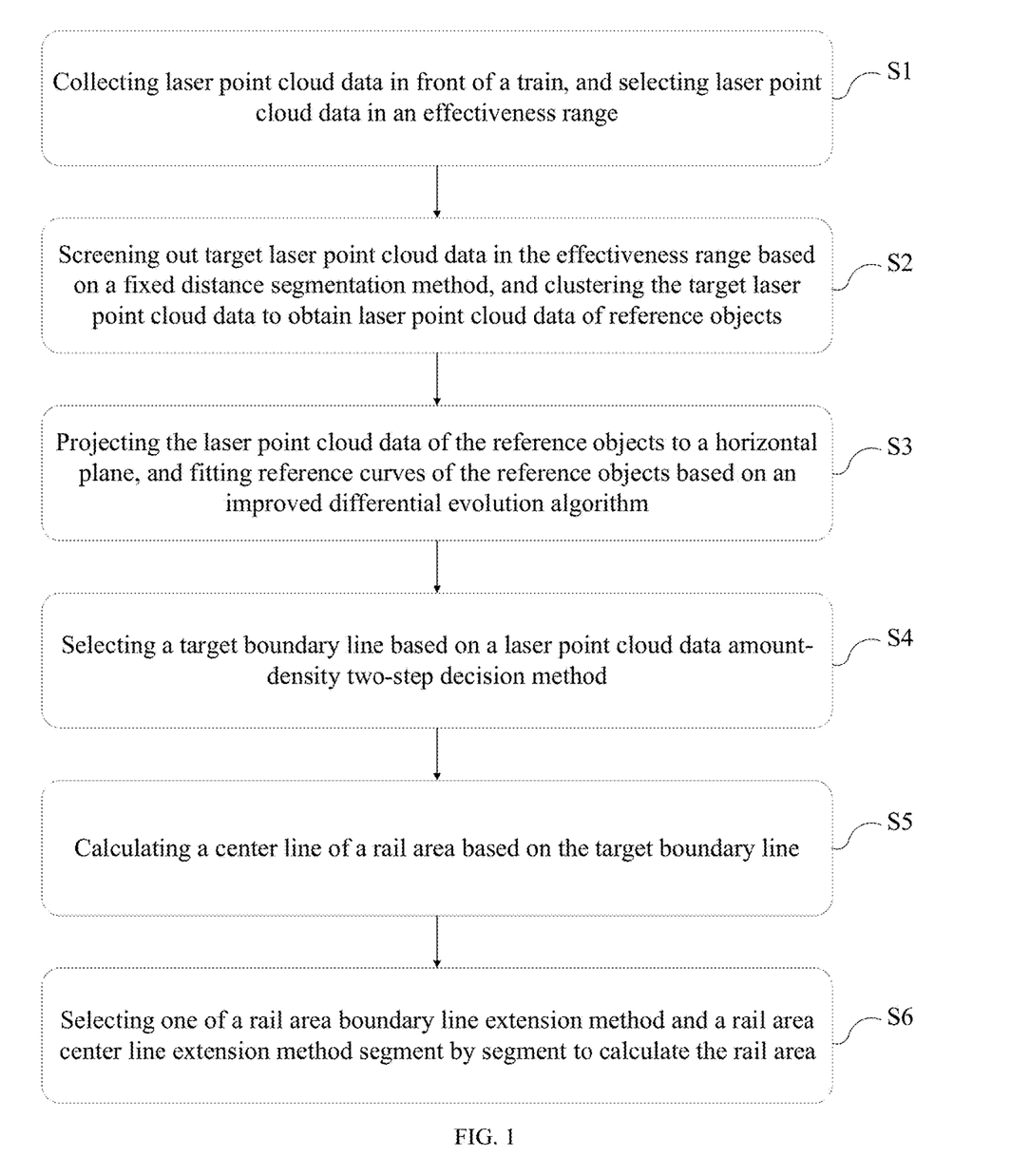
FIG. 1 illustrates a flowchart of a rail area extraction method based on laser point cloud data according to an embodiment of the disclosure.

As shown in FIG. 1, a rail area extraction method based on laser point cloud data is provided, including the following steps S1-S6.

In step S1, laser point cloud data in front of a train is collected, incomplete laser point cloud data caused by limitation of a field of view of a LiDAR and laser point cloud data beyond a limited maximum detection distance are filtered out from the laser point cloud data in front of the train, to thereby obtain remaining laser point cloud data.

In step S2, target laser point cloud data from the remaining laser point cloud data is screened out based on a fixed distance segmentation method, the target laser point cloud data is clustered to obtain laser point cloud data clusters, and a main cluster of the laser point cloud data clusters is used to represent laser point cloud data of reference objects.

In step S3, the laser point cloud data of the reference objects is projected to a horizontal plane, reference curves of the reference objects are fitted based on an improved differential evolution algorithm, and a reference curve of reference objects on a left side of the train of the reference curves of the reference objects is used as an upper boundary, and a reference curve of reference objects on a right side of the train of the reference curves of the reference objects is used as a lower boundary.

In step S4, a target boundary line is selected from the upper boundary and the lower boundary based on a laser point cloud data amount-density two-step decision method.

In step S5, a center line of a rail area is calculated based on the target boundary line.

In step S6, a threshold L is set, based on a height difference between the upper boundary and the lower boundary, the threshold L, the target boundary line, and the center line of the rail area, one of a rail area boundary line extension method and a rail area center line extension method is selected segment by segment to thereby calculate the rail area.

Through the above steps, the rail area is indirectly extracted based on the laser point cloud data in front of the train, thereby increasing a detection distance for the rail area under performance limitation of the LiDAR.

In an embodiment, in the step S2, the target laser point cloud data from the remaining laser point cloud data is screened out based on the fixed distance segmentation method, specifically including the following steps S21-S24.

In step S21, the remaining laser point cloud data is divided by using an interval with a length a to obtain laser point cloud data respectively corresponding to multiple intervals, k highest points of the laser point cloud data corresponding to each interval are determined, and an average value of the k highest points is calculated as an average height corresponding to each interval of the upper boundary. k lowest points of the laser point cloud data corresponding to each interval are determined, and an average value of the k lowest points is calculated as an average height corresponding to each interval of the lower boundary.

In step S22, a distance of length b is extended downwards by using the average height corresponding to each interval of the upper boundary as a basis to form an upper selection area corresponding to each interval, and a distance of length b is extended upwards by using the average height corresponding to each interval of the lower boundary as a basis to form a lower selection area corresponding to each interval.

In step S23, all laser point cloud data in the upper selection area corresponding to each interval and all laser point cloud data in the lower selection area corresponding to each interval are selected.

In step S24, all laser point cloud data in the upper selection area corresponding to the multiple intervals is joined to form a target upper selection area corresponding to the multiple intervals with an average width of b, and all laser point cloud data in the lower selection area corresponding to the multiple intervals is joined to form a target lower selection area corresponding to the multiple intervals with the average width of b.

In an embodiment, in the step S3, the reference curves of the reference objects are fitted based on the improved differential evolution algorithm, specifically including the following steps S31-S36.

In step S31, an initial population is generated randomly based on the laser point cloud data of the reference objects projected to the horizontal plane. The initial population includes: m randomly generated individuals I, and elements in each of the individuals I are all term coefficients of a curve polynomial.

In step S32, a mutation operation is performed on an $i^{th}$ individual $G_i$ in a current population to obtain a mutated individual $G_i'$. The current population of a first iteration is the initial population, and a formula of the mutation operation is expressed as follows:

$$G_i' = I_a + k_{mutate} \times (I_b - I_c);$$

where $k_{mutate}$ represents a mutation probability, and $I_a$, $I_b$ and $I_c$ represent three randomly generated individuals of the current population.

In step S33, a cross-selection operation is performed on the $i^{th}$ individual $G_i$ and the mutated individual $G_i'$ to obtain cross-selection individuals $G''_i$. A cross-selection operation of a $j^{th}$ element in the mutated individual $G_i'$ is expressed as follows:

$$G_{ij}'' = \begin{cases} G_{ij}', & G_{ij}' \leq k_{crossover} \\ G_{ij}, & G_{ij}' > k_{crossover} \end{cases};$$

where $k_{crossover}$ represents a cross-selection probability, $G_{ij}'$ represents a value of the $j^{th}$ element in the mutated individual $G_i'$, and $G_{ij}$ represents a value of a $j^{th}$ element in the $i^{th}$ individual $G_i$.

In step S34, a root mean square error of the cross-selection individual $G''_i$ is calculated, and a target solution (i.e., the reference curves of the reference objects) is updated when the root mean square error is smaller than a root mean square error corresponding to an individual prior to the $i^{th}$ individual $G_i$ in the current population (e.g., the root mean square error corresponding to an individual prior to the $i^{th}$ individual $G_i$ in the current population is a root mean square error of a cross-selection individual $G''_{i-1}$, and the cross-selection individual $G''_{i-1}$ is obtained by performing a cross-selection operation on an $(i-1)^{th}$ individual $G''_{i-1}$ and a mutated individual $G_{i-1}'$).

In step S35, the steps S32-S34 are performed until all individuals in the current population are traversed.

In step S36, the steps S32-S25 are performed until a maximum iteration number n is reached to thereby obtain the reference curves of the reference objects.

In an embodiment, in the step S4, the target boundary line is selected from the upper boundary and the lower boundary based on the laser point cloud data amount-density two-step decision method, specifically including the following steps.

A number difference between the laser point cloud data of the upper boundary and the laser point cloud data of the lower boundary is calculated, and whether the number difference exceeds a set threshold is determined. When the number difference exceeds the set threshold, a boundary with a larger number of laser point cloud data of the upper boundary and the lower boundary is selected as the target boundary line. When the number difference does not exceed the set threshold, root mean square errors of the upper boundary and the lower boundary are calculated, and a boundary with a smaller root mean square error of the upper boundary and the lower boundary is selected as the target boundary line. A formula for selecting the target boundary line is expressed as follows:

$$\text{target} = \begin{cases} A, & (n_A > n_B \times \beta) \text{ or } (n_A \leq n_B \times \mu \text{ and } RMSE(A) \leq RMSE(B)) \\ B, & (n_B > n_A \times \beta) \text{ or } (n_B \leq n_A \times \mu \text{ and } RMSE(A) > RMSE(B)) \end{cases};$$

where A represents the upper boundary, B represents the lower boundary, target represents the target boundary line, $n_A$ represents a number of the laser point cloud data of the upper boundary, $n_B$ represents a number of the laser point cloud data of the lower boundary, y represents a threshold coefficient, RMSE(A) represents a root mean square error of the upper boundary, and RMSE(B) represents a root mean square error of the lower boundary.

In an embodiment, in the step S6, based on a height difference between the upper boundary and the lower boundary, the threshold L, the target boundary line, and the center line of the rail area, one of the rail area boundary line extension method and the rail area center line extension method is selected segment by segment to calculate the rail area, specifically including the following steps S61-S62.

In step S61, highest points and lowest points of the upper boundary and the lower boundary are selected segment by segment, and an average height $h_{up}$ of the highest points corresponding to each interval of the upper boundary and an average height $h_{down}$ of the lowest points corresponding to each interval of the lower boundary are calculated.

In step S62, the threshold L is customized, the rail area center line extension method is used to calculate the rail area when a difference between the average height $h_{up}$ of the highest points and the average height $h_{down}$ of the lowest points is smaller than or equal to the threshold L; and the rail area boundary line extension method is used to calculate the rail area when the difference between the average height $h_{up}$ of the highest points and the average height $h_{down}$ of the lowest points is greater than the threshold L.

In the step S62, the rail area boundary line extension method is used to calculate the rail area when a difference between the average height $h_{up}$ of the highest points and the average height $h_{down}$ of the lowest points is smaller than or equal to the threshold L, specifically including the follows: a distance of $h_{extend}$ is extended downwards from the upper boundary to form the rail area when the target boundary line is the upper boundary, and the distance of $h_{extend}$ is extended upwards from the lower boundary to form the rail area when the target boundary line is the lower boundary. The rail area center line extension method is used to calculate the rail area when the difference between the average height $h_{up}$ of the highest points and the average height $h_{down}$ of the lowest points is greater than the threshold L, specifically including the follows: a distance of $$\frac{1}{2} h_{extend}$$

is extended upwards and downwards from the center line of the rail area respectively to form the rail area. The rail area is expressed by the following formula:

$$h = \begin{cases} \left[ \frac{|h_{up} - h_{down}|}{2} - \frac{1}{2} h_{extend}, \frac{|h_{up} - h_{down}|}{2} + \frac{1}{2} h_{extend} \right], & |h_{up} - h_{down}| \leq L \\ [h_{down}, h_{down} + h_{extend}] \text{ or } [h_{up} - h_{extend}, h_{up}], & |h_{up} - h_{down}| \geq L \end{cases}.$$

In order to verify the effectiveness of the technical solution, the embodiment uses train operation on a certain subway line as an example for description by using the following steps 1-8.

Figure 2:
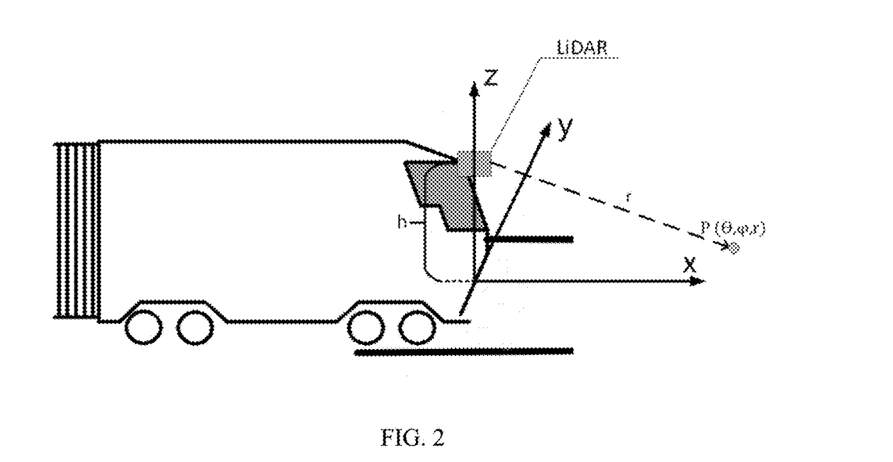
FIG. 2 illustrates a schematic diagram of an installation location of a LiDAR and information contained in laser point cloud data according to an embodiment of the disclosure.

In step 1, laser point cloud data is collected during train operation on Shanghai Metro Line 11. An installation location of the LiDAR and information contained in the laser point cloud data are shown in FIG. 2. The LiDAR is installed on a windshield in front of the train at a height h from the ground. A point P is used as an example to explain the information contained in the laser point cloud data, and P={θ, φ, r}. Specifically, θ represents an angle of a laser point cloud data point relative to the LiDAR in a vertical upward direction, φ represents an angle of the laser point cloud data point relative to the LiDAR in a horizontal forward direction, and r represents a distance between the laser point cloud data point and the LiDAR. A projection point of the LiDAR on the ground is used as an origin of a coordinate, a forward direction of the train is used as an X-axis, and the vertical upward direction is used as a Y-axis, to construct a right-handed rectangular coordinate system. A coordinate (x, y, z) of the laser point cloud data point is calculated through the following formulas:

$$x = r \sin\theta \cos\phi$$
$$y = r \sin\theta \sin\phi$$
$$z = r \cos\theta + h.$$

In step 2, the laser point cloud data in a range of 0 to 40 meters (m) and beyond 150 m are filtered out. The laser point cloud data in a range of 40 m to 150 m are selected as objects (i.e., the remaining laser point cloud data) processed by subsequent operations.

In step 3, target laser point cloud data is screened out and clustered based on the fixed distance segmentation method to obtain laser point cloud data of reference objects, specifically including the following steps (1)-(5).

In step (1), in the laser point cloud data in the range of 40 m to 150 m, with a=1 m as an interval, 3 highest points of the laser point cloud data corresponding to each interval are determined, and an average value of the 3 highest points is calculated as an average height corresponding to each interval of the upper boundary. 3 lowest points of the laser point cloud data corresponding to each interval are determined, and an average value of the 3 lowest points is calculated as an average height corresponding to each interval of the lower boundary.

Figure 3:
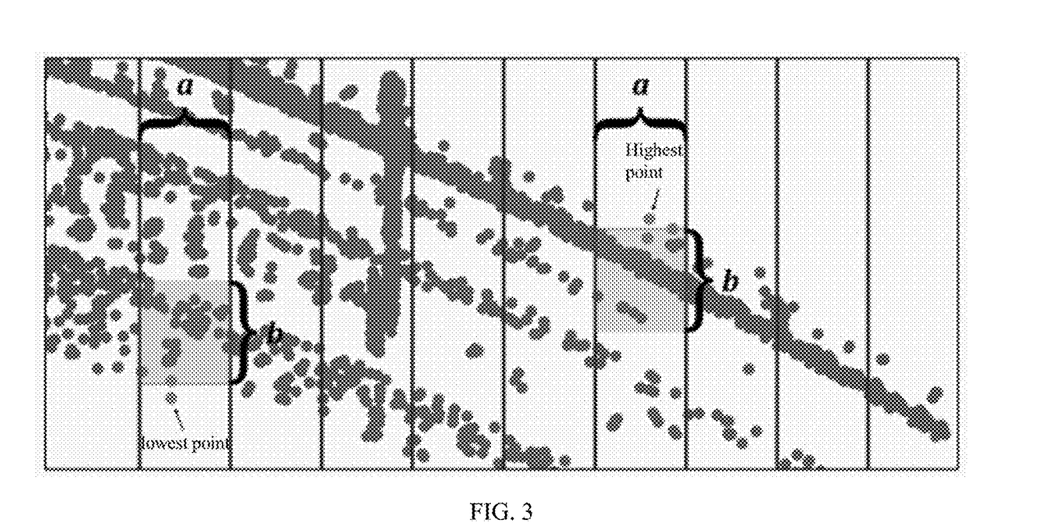
FIG. 3 illustrates a schematic diagram of an upper selection area and a lower selection area obtained when screening laser point cloud data of reference objects according to an embodiment of the disclosure.

In step (2), the average height corresponding to each interval of the upper boundary is used as a basis for downward extension b=2 m to form an upper selection area corresponding to each interval. The average height corresponding to each interval of the lower boundary is used as a basis for upward extension b=2 m to form a lower selection area corresponding to each interval. The upper selection area and the lower selection area are shown in FIG. 3.

In step (3), all laser point cloud data in the upper selection area corresponding to each interval and all laser point cloud data in the lower selection area corresponding to each interval are selected.

Figure 4:
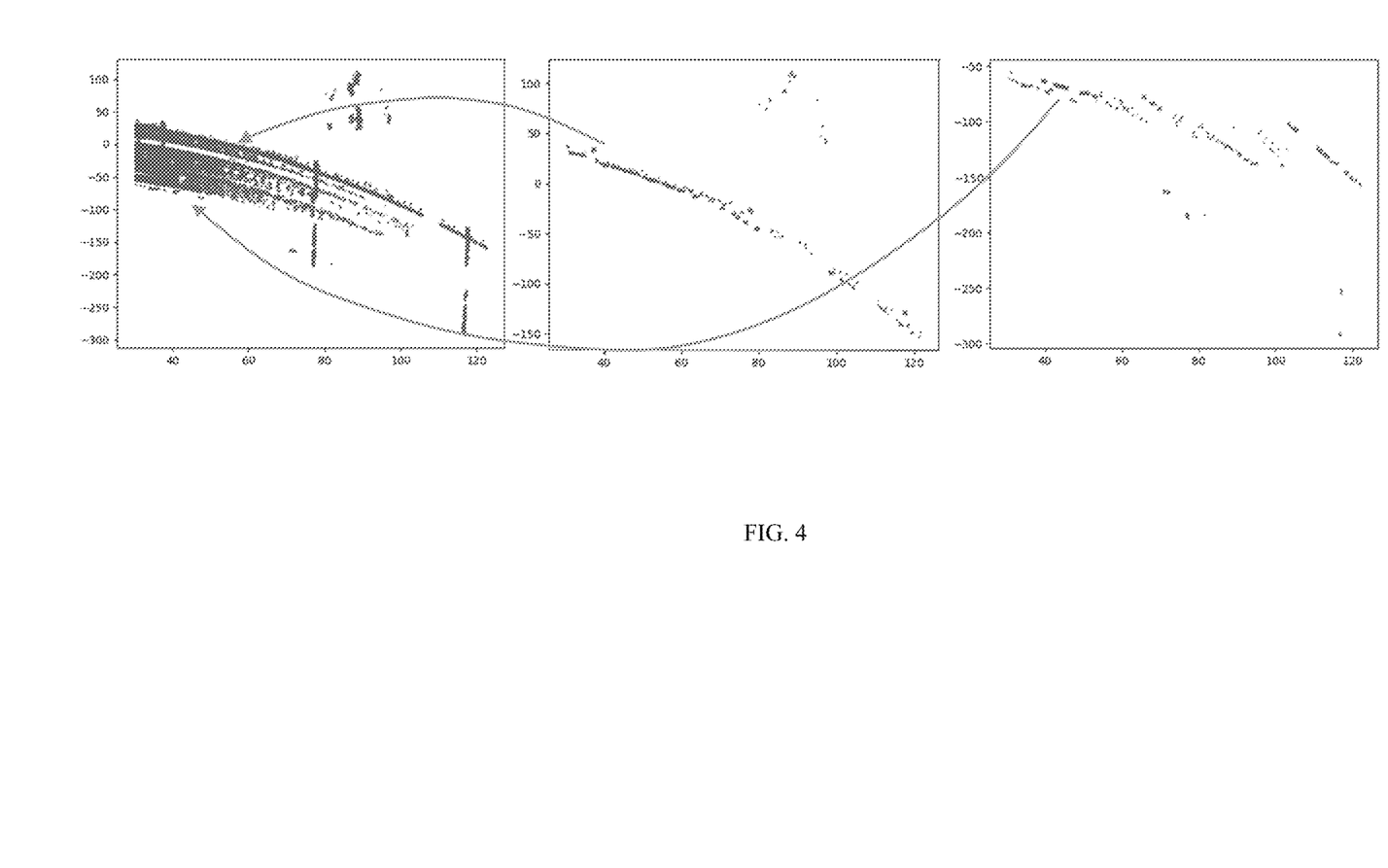
FIG. 4 illustrates a schematic diagram of a result of screening the laser point cloud data of the reference objects according to an embodiment of the disclosure. Specifically, 4(b) represents a result of a lower boundary, and 4(c) represents a result of an upper boundary.

In step (4), the laser point cloud data in the upper selection area corresponding to each interval is joined to form the upper boundary with an average width of 2 m, and the laser point cloud data in the lower selection area corresponding to each interval is joined to form the lower boundary with the average width of 2 m to thereby obtain the target laser point cloud data. The screening result is shown in FIG. 4.

Figure 5:
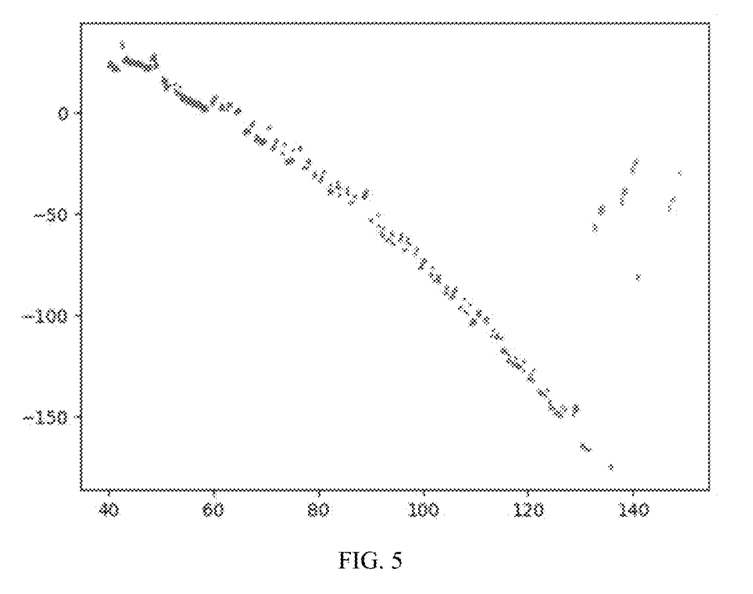
FIG. 5 illustrates a schematic diagram of a result of clustering the laser point cloud data of the reference objects of the lower boundary according to an embodiment of the disclosure.

In step (5), the screened laser point cloud data is clustered through a density-based spatial clustering of applications with noise (DBSCAN) cluster method to obtain laser point cloud data clusters, a parameter field radius is set as r=20 m, and a number threshold m of the laser point cloud data clusters is set to 20% of a total data set, to thereby obtain two boundaries representing the reference objects of the rail area. The clustering result is shown in FIG. 5.

In step 4, the laser point cloud data of the reference objects is projected to the horizontal plane to obtain two-dimensional laser point cloud data.

In step 5, for the two-dimensional laser point cloud data, reference curves of the reference objects are fitted based on the improved differential evolution algorithm, specifically including the following steps (1)-(6).

In step (1), an initial population including individuals m=20 is generated randomly based on the two-dimensional laser point cloud data of the reference objects, and each individual includes three term coefficients: $A_1$, $A_2$ and $A_3$. That is, the ultimately generated curve polynomial is $$A_1 x^2 + A_2 x + A_3.$$

In step (2), a mutation probability is set as $k_{mutate}$=0.8, and three individuals $I_a$, $I_b$ and $I_c$ of the current population are generated randomly. A mutation operation is performed on an $i^{th}$ individual $G_i$ according to a formula $G_i' = I_a + k_{mutate} \times (I_b - I_c)$, and the mutated individual is recorded as $G_i'$.

In step (3), a cross-selection probability is set as $k_{crossover}$=0.8, a cross-selection operation is performed on the $i^{th}$ individual $G_i$ and the mutated individual $G_i'$ to obtain a cross-selection individual $G''_i$. A cross-selection operation of a $j^{th}$ element in the mutated individual $G_i'$ is expressed as follows:

$$G''_{ij} = \begin{cases} G'_{ij}, & G'_{ij} \leq k_{crossover} \\ G_{ij}, & G'_{ij} > k_{crossover} \end{cases};$$

where $G_{ij}'$ represents a value of the $j^{th}$ element in the mutated individual $G_i'$, and $G_{ij}$ represents a value of a $j^{th}$ element in the $i^{th}$ individual $G_i$.

In step (4), $y_i$ is converted into a y-coordinate value of an $i^{th}$ sample point in the two-dimensional laser point cloud data, $y_i'$ is converted into a y-coordinate value corresponding to an x-coordinate value of the $i^{th}$ sample point in the two-dimensional laser point cloud data on a prediction curve. According to a formula $$RMSE = \sqrt{\frac{1}{n}\sum_{i=1}^{n}(y_i' - y_i)^2},$$

a root mean square error (RMSE) of the cross-selection individual $G''_i$ is calculated. A target solution (i.e., the reference curves of the reference objects) is updated when the RMSE decreases.

In step (5), the steps (2)-(4) are performed until 20 individuals in the current population are traversed.

In step (6), the steps (2)-(5) are performed until a maximum iteration number 80 is reached, and the target solution is used as a fitting result of the reference curves.

Figure 6:
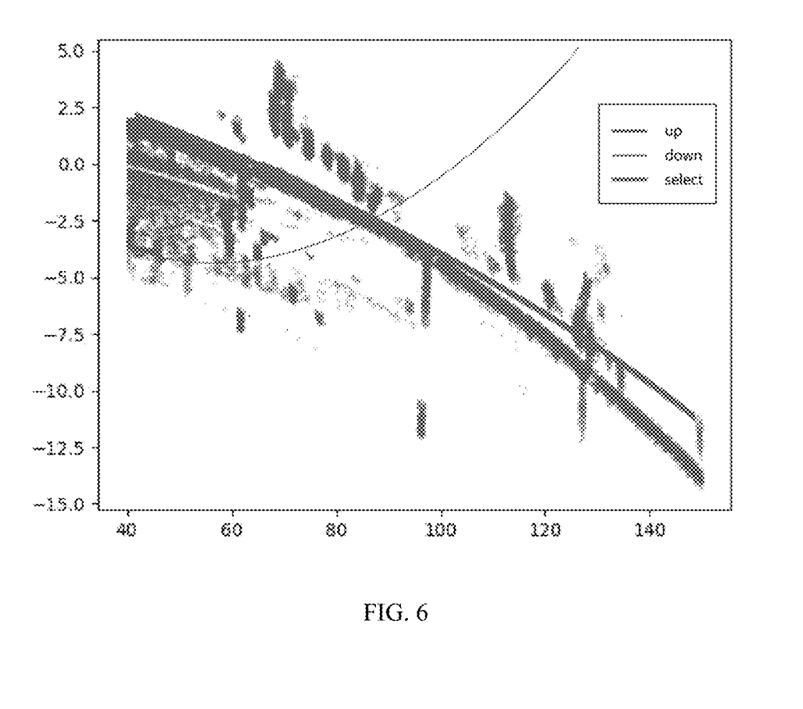
FIG. 6 illustrates a schematic diagram of a result of selecting a target boundary line according to an embodiment of the disclosure.

In step 6, a threshold coefficient is set as β=3, and the target boundary line is calculated according to the following formula:

$$\text{target} = \begin{cases} A, & (n_A > n_B \times \beta) \text{ or } (n_A \le n_B \times \mu \text{ and } RMSE(A) \le RMSE(B)) \\ B, & (n_B > n_A \times \beta) \text{ or } (n_B \le n_A \times \mu \text{ and } RMSE(A) > RMSE(B)) \end{cases};$$

a selecting result of the target boundary line is shown in FIG. 6.

In step 7, the target boundary line is moved to an average of the average height of the highest points and the average height of the lowest points, and the average is used as a center line of the rail area.

In step 8, a horizontal range of the rail area is calculated by using one of the rail area boundary line extension method and the rail area center line extension method segment by segment, specifically including the following steps (1)-(3).

In step (1), the laser point cloud data of highest and lowest points on the upper boundary and the lower boundary are selected segment by segment, an average height of the highest points corresponding to the interval of 1 m of the upper boundary and an average height of the lowest points corresponding to the interval of 1 m of the lower boundary are calculated starting from an interval of 40-41 m. The average height of the multiple highest points of the upper boundary is recorded as $h_{up}$, and the average height of the multiple lowest points of the lower boundary is recorded as $h_{down}$.

In step (2), the threshold is set as L=6 m, the rail area center line extension method is used to calculate the rail area when a difference between the average height $h_{up}$ of the highest points and the average height $h_{down}$ of the lowest points is smaller than or equal to L. The rail area boundary line extension method is used to calculate the rail area when the difference between the average height $h_{up}$ of the highest points and the average height $h_{down}$ of the lowest points is greater than L.

Specifically, the step (2) specifically includes the follows: an extension distance is set as $h_{extend}$=2.6 m. When using the rail area boundary line extension method, a distance of $h_{extend}$ is extended downwards from the upper boundary to form the rail area when the target boundary line is the upper boundary; and the distance of $h_{extend}$ is extended upwards from the lower boundary to form the rail area when the target boundary line is the lower boundary. When using the rail area center line extension method, a distance of $$\frac{1}{2}h_{extend}$$

is extended upwards and downwards from the center line of the rail area respectively to form the rail area. The rail area is expressed as follows:

$$h = \begin{cases} \left[\frac{|h_{up} - h_{down}|}{2} - \frac{1}{2}h_{extend}, \frac{|h_{up} - h_{down}|}{2} + \frac{1}{2}h_{extend}\right], & |h_{up} - h_{down}| \le L \\ [h_{down}, h_{down} + h_{extend}] \text{ or } [h_{up} - h_{extend}, h_{up}], & |h_{up} - h_{down}| \ge L \end{cases}.$$

Figure 7:
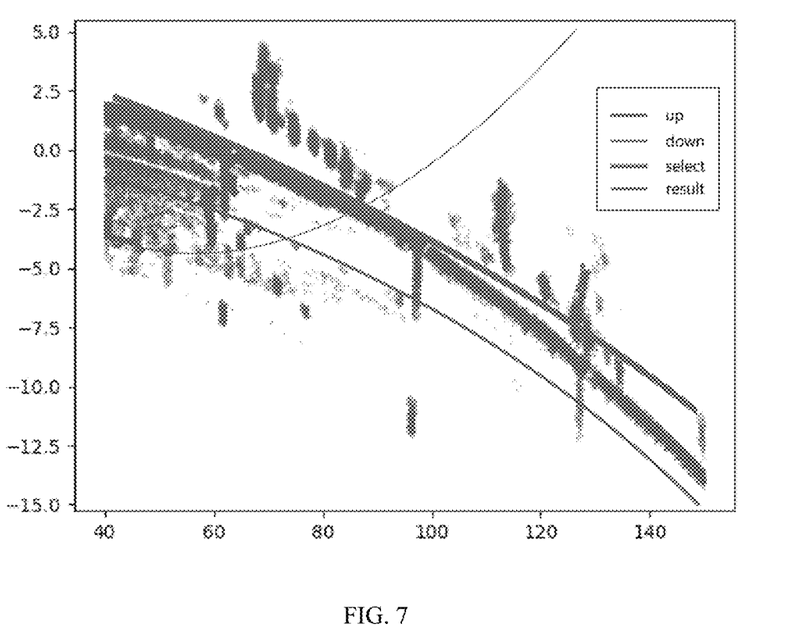
FIG. 7 illustrates a schematic diagram of a result of extracting the rail area according to an embodiment of the disclosure.

Finally, an extracting result of the rail area is shown in FIG. 7.

In summary, it can be seen that the technical solution achieves indirect detection of rails by detecting tunnel walls, protective walls and sound insulation barriers parallel to the rails. Under a prerequisite of the performance limitations of the existing LiDAR, the technical solution can increase the detection distance of the rail area, and help to improve obstacle detection distance and accuracy.

What is claimed is:

1. A rail area extraction method based on laser point cloud data, comprising:
   S1, collecting laser point cloud data in front of a train, and filtering out incomplete laser point cloud data caused by limitation of a field of view of a light detection and ranging (LiDAR) and laser point cloud data beyond a limited maximum detection distance from the laser point cloud data in front of the train, to thereby obtain remaining laser point cloud data;
   S2, screening out, based on a fixed distance segmentation method, target laser point cloud data from the remaining laser point cloud data, clustering the target laser point cloud data to obtain laser point cloud data clusters, and taking a main cluster of the laser point cloud data clusters to represent laser point cloud data of reference objects;
   S3, projecting the laser point cloud data of the reference objects to a horizontal plane, fitting, based on an improved differential evolution algorithm, reference curves of the reference objects, and taking a reference curve of reference objects on a left side of the train of the reference curves of the reference objects as an upper boundary, and a reference curve of reference objects on a right side of the train of the reference curves of the reference objects as a lower boundary; wherein the fitting, based on an improved differential evolution algorithm, reference curves of the reference objects, specifically comprises:
   S31, generating an initial population randomly based on the laser point cloud data of the reference objects projected to the horizontal plane, wherein the initial population comprises: m randomly generated individuals I, and elements in each of the individuals I are all term coefficients of a curve polynomial;
   S32, performing a mutation operation on an i$^{th}$ individual $G_i$ in a current population to obtain a mutated individual $G_i'$; wherein the current population of a first iteration is the initial population, and a formula of the mutation operation is expressed as follows:

$$G_i' = I_a + k_{mutate} \times (I_b - I_c);$$

wherein $k_{mutate}$ represents a mutation probability, and $I_a$, $I_b$, and $I_c$ represent three randomly generated individuals of the current population;
   S33, performing a cross-selection operation on the i$^{th}$ individual $G_i$ and the mutated individual $G_i'$ to obtain a cross-selection individual $G''_i$; wherein a cross-selection operation of a j$^{th}$ element in the mutated individual $G_i'$ is expressed as follows:

$$G''_{ij} = \begin{cases} G'_{ij}, & G'_{ij} \le k_{crossover} \\ G_{ij}, & G'_{ij} > k_{crossover} \end{cases};$$

S34, calculating a root mean square error of the cross-selection individual G"$_i$, and updating a target solution when the root mean square error is smaller than a root mean square error corresponding to an individual prior to the i$^{th}$ individual G$_i$ in the current population;

S35, performing the steps S32-S34 until all individuals in the current population are traversed; and S36, performing the steps S32-S35 until a maximum iteration number n is reached to thereby obtain the reference curves of the reference objects;

S4, selecting, based on a laser point cloud data amount-density two-step decision method, a target boundary line from the upper boundary and the lower boundary, specifically comprising:

calculating a number difference between the laser point cloud data of the upper boundary and the laser point cloud data of the lower boundary, determining whether the number difference exceeds a set threshold; in response to the number difference exceeding the set threshold, selecting a boundary with a larger number of laser point cloud data of the upper boundary and the lower boundary as the target boundary line; or, in response to the number difference not exceeding the set threshold, calculating root mean square errors of the upper boundary and the lower boundary respectively, and selecting a boundary with a smaller root mean square error of the upper boundary and the lower boundary as the target boundary line; wherein a formula for selecting the target boundary line is expressed as follows:

$$\text{target} = \begin{cases} A, & (n_A > n_B \times \beta) \text{ or } (n_A \le n_B \times \mu \text{ and } RMSE(A) \le RMSE(B)) \\ B, & (n_B > n_A \times \beta) \text{ or } (n_B \le n_A \times \mu \text{ and } RMSE(A) > RMSE(B)) \end{cases};$$

wherein A represents the upper boundary, B represents the lower boundary, T represents the target boundary line, $n_A$ represents a number of the laser point cloud data of the upper boundary, $n_B$ represents a number of the laser point cloud data of the lower boundary, $\mu$ represents a threshold coefficient, RMSE(A) represents a root mean square error of the upper boundary, and RMSE(B) represents a root mean square error of the lower boundary;

S5, calculating, based on the target boundary line, a center line of a rail area; and S6, setting a threshold L, and based on a height difference between the upper boundary and the lower boundary, selecting one of a rail area boundary line extension method and a rail area center line extension method segment by segment to thereby calculate the rail area, specifically comprising:

S61, selecting highest points and lowest points of the upper boundary and the lower boundary segment by segment, and calculating an average height $h_{up}$ of the highest points corresponding to each interval of the upper boundary and an average height $h_{down}$ of the lowest points corresponding to each interval of the lower boundary;

S62, customizing the threshold L, using the rail area center line extension method to calculate the rail area when a difference between the average height $h_{up}$ of the highest points and the average height $h_{down}$ of the lowest points is smaller than or equal to the threshold L; or using the rail area boundary line extension method to calculate the rail area when the difference between the average height $h_{up}$ of the highest points and the average height $h_{down}$ of the lowest points is greater than the threshold L; and S63, in the rail area boundary line extension method, extending a distance of $h_{extend}$ downwards from the upper boundary to form the rail area when the target boundary line is the upper boundary, or extending the distance of $h_{extend}$ upwards from the lower boundary to form the rail area when the target boundary line is the lower boundary; and in the rail area center line extension method, extending a distance of $$\frac{1}{2} h_{extend}$$

upwards and downwards from the center line of the rail area respectively to form the rail area, wherein the rail area is expressed by the following formula:

$$h = \begin{cases} \left[\frac{|h_{up} - h_{down}|}{2} - \frac{1}{2} h_{extend}, \frac{|h_{up} - h_{down}|}{2} + \frac{1}{2} h_{extend}\right], & |h_{up} - h_{down}| \le L \\ [h_{down}, h_{down} + h_{extend}] \text{ or } [h_{up} - h_{extend}, h_{up}], & |h_{up} - h_{down}| \ge L \end{cases}.$$

2. The rail area extraction method based on laser point cloud data as claimed in claim 1, wherein in the step S2, the screening out, based on a fixed distance segmentation method, target laser point cloud data from the remaining laser point cloud data, specifically comprises:

S21, dividing, by using an interval with a length a, the remaining laser point cloud data to obtain laser point cloud data respectively corresponding to multiple intervals, and determining k highest points of the laser point cloud data corresponding to each of the multiple intervals and calculating an average value of the k highest points as an average height corresponding to each of the multiple intervals of the upper boundary; and determining k lowest points of the laser point cloud data corresponding to each of the multiple intervals and calculating an average value of the k lowest points as an average height corresponding to each of the multiple intervals of the lower boundary;

S22, extending, by using the average height corresponding to each of the multiple intervals of the upper boundary as a basis, a distance of length b downwards to form an upper selection area corresponding to each of the multiple intervals, and extending, by using the average height corresponding to each of the multiple intervals of the lower boundary as a basis, the distance of length b upwards, to form a lower selection area corresponding to each of the multiple intervals;

S23, selecting all laser point cloud data in the upper selection area corresponding to each of the multiple intervals and all laser point cloud data in the lower selection area corresponding to each of the multiple intervals; and S24, joining all laser point cloud data in the upper selection area corresponding to the multiple intervals to form a target upper selection area corresponding to the multiple intervals with an average width of b, and joining all laser point cloud data in the lower selection area corresponding to the multiple intervals to form a target lower selection area corresponding to the multiple intervals with the average width of b to thereby obtain the target laser point cloud data.

* * * * *